United States Patent [19]

Kovacs

[11] 4,376,048
[45] Mar. 8, 1983

[54] SLUDGE COLLECTOR FOR USE IN A SETTLING BASIN

[75] Inventor: Nandor Kovacs, Geneva, Switzerland
[73] Assignee: Kemiko SA, Geneva, Switzerland
[21] Appl. No.: 289,478
[22] Filed: Aug. 3, 1981
[30] Foreign Application Priority Data

Aug. 14, 1980 [CH] Switzerland .................. 6128/80

[51] Int. Cl.³ ............................................. B01D 21/10
[52] U.S. Cl. ............................... 210/221.1; 210/519; 210/416.1; 210/523
[58] Field of Search ............... 210/220, 221.1, 416.1, 210/416.2, 519, 523, 525, 533–535

[56] References Cited

U.S. PATENT DOCUMENTS

| | | | |
|---|---|---|---|
| 1,648,607 | 11/1927 | Brown | 210/525 X |
| 1,694,668 | 12/1928 | Peters | 210/533 X |
| 1,793,510 | 2/1931 | Raymond | 210/519 |
| 2,468,069 | 4/1949 | Hunter | 210/523 X |
| 2,732,944 | 1/1956 | Hays | 210/534 X |
| 2,874,850 | 2/1959 | Unthank | 210/519 |
| 3,975,276 | 8/1976 | Schmid | 210/525 X |

FOREIGN PATENT DOCUMENTS 543149 12/1955 Belgium ....................... 210/533

*Primary Examiner*—Robert H. Spitzer
*Attorney, Agent, or Firm*—Werner W. Kleeman

[57] ABSTRACT

In order to achieve improved collection of sludge in a settling basin, without employing moving parts, a collecting trough is provided, this trough being open at the top and bounded on the sides by horizontal overflow-weirs and being intended to rest on the bottom of the basin. A line, located level with the bottom of the collecting trough, issues from the trough and runs to a suction pump. The trough is covered by a hood which widens towards the bottom and leaves an unobstructed interspace between itself and the overflow-weirs, this hood possessing openings which lie at a lower level than the overflow-weirs.

7 Claims, 4 Drawing Figures

SLUDGE COLLECTOR FOR USE IN A SETTLING BASIN

FIELD OF THE INVENTION

The invention relates to a sludge collector equipped with a suction pump and intended for use in a settling basin, in particular of a sewage purification plant.

BACKGROUND OF THE INVENTION

The majority of known sludge collectors of the above type possess moving parts, which are located on, in the vicinity of, the bottom of the basin.

So-called blade-type collectors possess a clearing-blade, which is periodically moved along the bottom and pushes the sludge which has settled into a trough formed in the bottom of the basin, whence the sludge is drawn off from the trough by means of the suction pump. As a rule circular settling basins are provided with a so-called rotary collector, whose clearing-blade starts from the centre of the basin and executes a rotary movement so that the sludge which has settled gradually moves into a depression which is located at the periphery or in the middle of the bottom of the basin.

So-called chain-type collectors function in a similar manner, in which clearing-beams are located at intervals, between two endless, parallel revolving chains, these beams sweeping the bottom of the basin in the manner of a dredger and conveying the sludge which has settled into a trough formed in the bottom.

Another known sludge collector is the so-called suction-type collector, in which the bottom of the basin is swept by a pipe having inlet-openings or inlet-slots and which is connected to a suction pump, in a manner similar to the suction-nozzle of a vacuum cleaner.

All these sludge collectors, which are provided with parts which are themselves moved in the basin, give rise to flows in the contents of the basin, which at least disturb the settling of the sludge. Moreover, these known collectors are subject to mechanical faults which necessitate expensive maintenance operations.

In this regard, so-called funnel-basins constitute an exception; in these the bottom of the basin has the form of a conical or pyramidal funnel, or of a succession of several such funnels superimposed on each other, with a suction line emerging from the lowest point of this funnel, via which line the sludge is removed from the basin. However, apart from considerable construction costs, these funnel-basins have the disadvantage that the only sludge removed is that which actually reaches the lowest point of the funnel, whilst other sludge particles deposit on the wall of the funnel and can there lead to accumulations of sludge, which are beyond the "range" of the suction line.

OBJECTS AND SUMMARY OF THE INVENTION

The production of a sludge collector of the type mentioned in the introduction is accordingly to be regarded as an object of the invention, namely the production of a sludge collector for removing the sludge which has settled in the basin in a safe and reliable manner, either continuously or intermittently, according to choice, without any moving parts being present in the basin itself.

According to the present invention, there is provided a sludge collector equipped with a suction pump and intended for use in a settling basin, the collector comprising a collecting trough open at the top and bounded on its sides by horizontal overflow-weirs, and being intended to rest on the bottom of the settling basin, a line located level with the bottom of the collecting trough, issuing from the said trough and running to the suction side of the suction pump, the trough being covered by a hood which widens towards the bottom and leaves an unobstructed interspace between itself and the overflow-weirs, the hood having openings which lie at a lower level than the overflow-weirs.

Other, optional features of the invention will become apparent from the following description and claims.

BRIEF DESCRIPTION OF THE DRAWINGS

The invention will be further described in a purely illustrative manner, by reference to the drawings, in which.

DESCRIPTION OF THE PREFERRED EMBODIMENT

Figure 1:
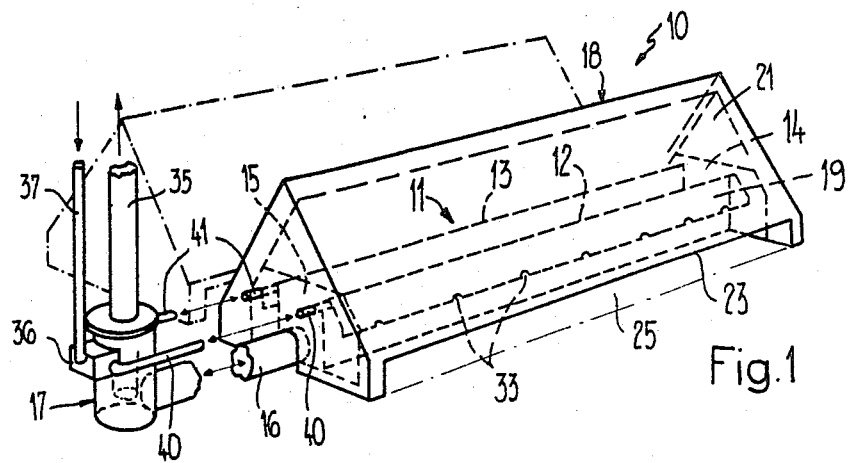
FIG. 1 shows an embodiment of the present sludge collector, in a perspective partially exploded view.
Figure 3:
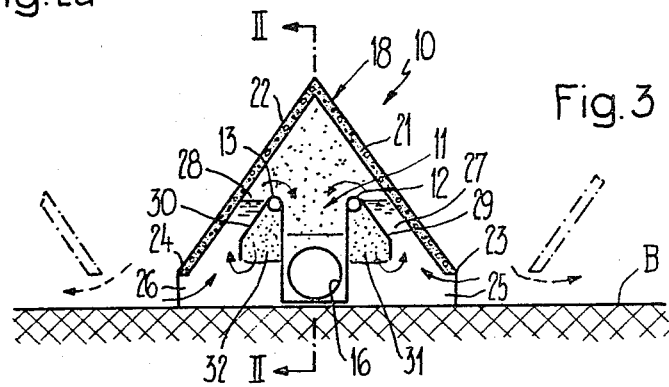
FIG. 3 shows a simplified cross-section along the line III—III of FIG. 2.

As indicated in FIGS. 1 and 3, a sludge-collecting installation, according to the invention, possess a number of sludge collectors 10, all of identical design, resting on the bottom B of a settling basin, parallel to each other and spaced apart from each other.

Each sludge collector 10 possesses an elongated collecting trough 11, open at the top and bounded on the sides, in each case, by a horizontal overflow-weir 12, 13, this trough resting on the bottom B. At the ends, the collecting trough 11 is closed by means of two plates 14, 15, a pipe 16 passing through the plate 15, this pipe being located at the level of the bend of the collecting trough 11, and leasing to a suction-head of a compressed air lift marked by reference numeral 17 (also called a mammoth pump).

The collecting trough 11 is covered, over its entire length, by a hood 18, which is manufactured from a material having a high density, for example from concrete. The hood 18 has the form of a ridge-roof, closed at the ends by means of two gable-walls 19, 20. The roof areas 21, 22, which are inclined with respect to the horizontal by approximately 45° or more, each terminate at an eave 23 or 24, the gable-walls 19, 20 extending to below these eaves 23, 24. As a consequence of this arrangement, the hood 18 is supported on the bottom B of the basin via only the gable-walls 19, 20, so that openings 25, 26 remain free between the eaves 23, 24 and the bottom B, over virtually the entire length of the hood 18, these openings lying at a lower level than the overflow-weirs 12, 13 of the collecting trough.

Interspaces 27 and 28 are present between the interior surfaces of the roof areas 21, 22 and the overflow-weirs 12, 13 facing these interior surfaces, these interspaces extending over the entire length of the hood 18 and that of the collecting trough 11. These interspaces 27, 28 are bounded, in each case, by a tab 29, 30, which starts at the overflow-weir 12, 13 in question, is pointed obliquely downwards, and extends over the entire length of the collecting trough 11. A trough-shaped chamber 31, 32, open in the downward direction, is consequently formed, in each case, between each side wall of the collecting trough 11 and the corresponding tab 29 or 30, and reference will again be made to these chambers later in the text. The lower, free edges of the tabs 29, 30 are located somewhat higher than the eaves 23, 24 of the hood 18, and are provided with notches 33 at regular intervals, the purpose of which has yet to be explained.

As already mentioned, the line 16 leads, from the collecting trough 11, into the suction-head of the compressed air lift 17. This suction-head has a chamber 34, into which the line 16 opens, at the level of the bottom. A lift pipe 35, open at the bottom, issues from the chamber 34, passing through the cover thereof. A compressed air distribution-head 36 is assigned to the chamber 34, the said distribution-head being connected, via a supply line 37, to a source 38 of compressed air, indicated only schematically in FIG. 2. An opening 39, between the chamber 34 and the compressed air distribution-head 36, is present at the level of the cover of the said chamber. Two lines 40, 41 emerge from the compressed air distribution-head, beneath the opening 39, these lines opening into the chambers 31 and 32 in their apex region.

Figure 2:
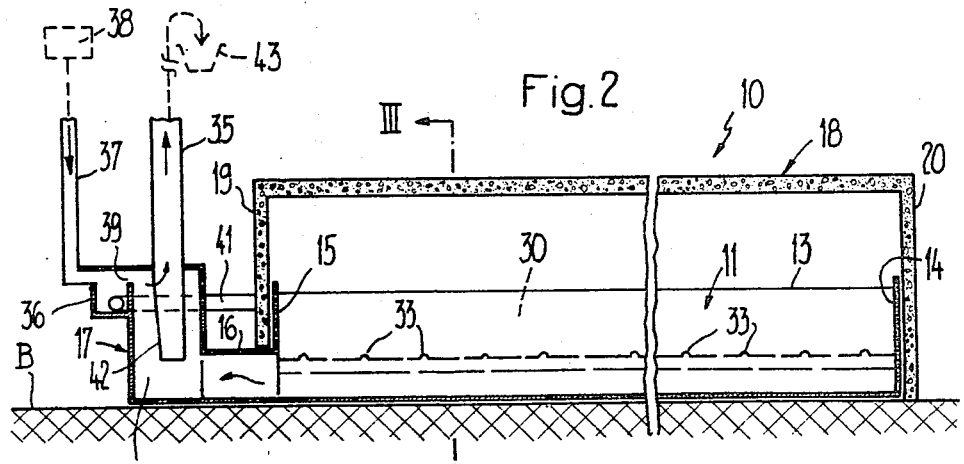
FIG. 2 shows a simplified longitudinal section through the sludge collector of FIG. 1, approximately along the line II—II of FIG. 3.
Figure 2A:
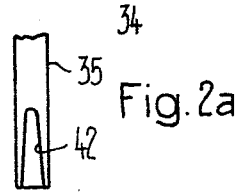
FIG. 2a shows a view, from the left, of the lift pipe appearing in FIG. 2.

As can be seen from FIG. 2 and, in particular, from FIG. 2a, a cut-out 42 is formed in the wall of the lift pipe 35, this cut-out starting from the lowermost edge of the pipe, tapering upwards, and terminating at approximately the level of the opening 39.

Finally, it is indicated in FIG. 2 that the lift pipe leads to a discharge trough 43 for the sludge, this trough being indicated only schematically.

The mode of operating the sludge collector described above will now be explained, this sludge collector resting, as already mentioned, on the bottom B of the settling basin, and being completely immersed in the contents of the basin. The normal level of the contents of the basin consequently lies considerably higher than the ridge-line of the hood 18. It may now be assumed that compressed air has not yet been supplied to the compressed air distribution-head 36, and that both the hood 18 and the collecting trough 11, the line 16, the chamber 34, and the compressed air distribution-head 36, or, in brief, all components lying below the level of the contents of the basin, are filled with water. The settling sludge slides downwards along the roof areas 21, 22, and settles on the bottom B, principally in the region of the openings 25, 26.

Compressed air is now supplied to the compressed air distribution-head 36. The level of the water situated in the distribution-head 36 and in the chamber 34 is initially forced downwards by the compressed air, until the latter can enter the lift pipe, through the cutout 42, and ascend in this pipe. As a result of this, the water column situated in the lift pipe moves upwards (principle of the mammoth pump) and draws water from the chamber 34 and consequently from the line 16 and from the collecting trough 11. The water level in the distribution-head 36 is gradually forced down still further, until the opening to the lines 40, 41 becomes clear. In the chambers 31, 32, the water is forced downwards by the air which is flowing in via the lines 40, 41, until the water level has reached approximately the lower, free edge of the tabs 29, 30. On account of the notches 33, distributed uniformly in the longitudinal direction, the air now flows, in the form of bubbles, up into the interspaces 27, 28, and fills the empty space below the hood 18. The rising bubbles of air carry particles of sludge with them and consequently have an advantageous flotation effect. The water level beneath the hood 18 and, in particular, in the collecting trough 11 is forced downwards by the air. This process continues until the level in the collecting trough 11 clears the line 16, so that air can temporarily escape in the lift pipe 35. At the same time, more sludge is forced over the overflow-weirs 12, 13, into the collecting trough 11. The sludge level in the collecting trough 11 rises again. The venting of the hood 18 and, consequently, also the filling of the collecting trough is interrupted as soon as the sludge level in the collecting trough 11 again exceeds the level of the line 16. More sludge now flows to the compressed air lift 17. The process of emptying the collecting trough begins anew. Of course, this pulsating or intermittently occurring emptying of the collecting troughs also causes the flow in the interspaces 27 and 28 to pulsate. It has been found that this pulsating flow produces a side-effect which is particularly welcome. This side-effect takes the form of a certain tendency to thicken the sludge to an additional extent.

While there are shown and described present preferred embodiments of the invention, it is to be distinctly understood that the invention is not limited thereto, but may be otherwise variously embodied and practiced within the scope of the following claims. Accordingly,

I claim:

1. A sludge collector for use in a settling basin, and comprising: a suction pump; a collecting trough open at its top; horizontal overflow-weirs bounding the sides of the collecting trough and being intended to rest on the bottom of the settling basin; a line level with the bottom of the collecting trough, issuing from the trough and running to the suction side of the suction pump; a hood covering the trough, the hood widening towards its bottom and leaving an unobstructed interspace between itself and the overflow-weirs, this hood having apertures defined therein which lie at a lower level than the overflow-weirs; the suction pump being in the form of a mammoth pump which is operated by means of compressed air and comprises a chamber and a line emerging from the chamber, the line emerging from the collecting trough opening into a lift pipe of the mammoth pump; a compressed air distribution-head communicating with the chamber and a compressed air supply line connected to the distribution head; tabs adjoining the overflow-weirs, said tabs having free lower edges and pointing obliquely downwards and away from the collecting trough and forming a chamber open in the downward direction, between themselves and the side walls of the collecting chamber; at least one compressed air supply line, issuing from the compressed air distribution-head opening into this chamber, and the free, lower edges of the tabs being located higher than the openings formed in the hood.

2. A sludge collector according to claim 1, wherein the collecting trough is elongated and the hood is roof-shaped, the hood having interior surfaces facing, and substantially parallel to, the tabs.

3. A sludge collector according to claim 1, wherein the free, lower edges of the tabs are provided with notches which are located at intervals from each other.

4. A sludge collector according to claim 1, wherein the at least one compressed air line which leads to the chambers issues from the compressed air distribution-head at a lower level than the opening which leads from the said distribution-head to the chamber of the mammoth pump.

5. A sludge collector according to claim 1, wherein the collecting trough is elongated, and the hood has the form of a ridge-roof and comprises gable walls by means of which it is closed, the gable-walls which extend downwards beyond the eaves of the roof areas being adapted to rest on the bottom of the basin.

6. A sludge collector according to claim 5 wherein the collecting trough comprises upright plates by means of which it is closed at both ends, these plates resting, via a portion of their profile, against the interior surface of the roof areas of the hood.

7. A sludge collector for use in a settling basin, and comprising: a suction pump; a collecting trough open at its top; horizontal overflow-weirs bounding the sides of the collecting trough and being intended to rest on the bottom of the settling basin; a line level with the bottom of the collecting trough, issuing from the trough and running to the suction side of the suction pump; a hood covering the trough, the hood widening towards its bottom and leaving an unobstructed interspace between itself and the overflow-weirs, this hood having apertures defined therein which lie at a lower level than the overflow-weirs; the suction pump being in the form of a mammoth pump which is operated by means of compressed air and comprises a chamber and a line emerging from the chamber, the line emerging from the collecting trough opening into a lift pipe of the mammoth pump; the lift pipe has a wall with a cut-out defined therein, this cut-out running from the lower end of the said pipe, converging in the upward direction, and ending substantially at the level of the opening which leads into the chamber from the compressed air distribution-head.

* * * * *